(12) United States Patent
Agardh

(10) Patent No.: US 9,191,884 B2
(45) Date of Patent: Nov. 17, 2015

(54) SYSTEM AND METHOD FOR DETECTING ACCESS POINTS TRANSMITTING OUTSIDE OF THE REGULATED FREQUENCY RANGE

(75) Inventor: Kåre Agardh, Rydebäck (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 319 days.

(21) Appl. No.: 13/540,480

(22) Filed: Jul. 2, 2012

(65) Prior Publication Data

US 2014/0004868 A1  Jan. 2, 2014

(51) Int. Cl.
*H04W 72/00* (2009.01)
*H04W 48/16* (2009.01)
*H04W 24/08* (2009.01)

(52) U.S. Cl.
CPC .............. *H04W 48/16* (2013.01); *H04W 24/08* (2013.01)

(58) Field of Classification Search
CPC .............................. H04W 48/16; H04W 24/08
See application file for complete search history.

(56) References Cited

U.S. PATENT DOCUMENTS

| | | | |
|---|---|---|---|
| 2006/0187829 A1* | 8/2006 | Heiner et al. | 370/229 |
| 2009/0036098 A1* | 2/2009 | Lee et al. | 455/411 |
| 2011/0103242 A1* | 5/2011 | Hittel et al. | 370/252 |
| 2011/0243094 A1* | 10/2011 | Dayal et al. | 370/331 |

FOREIGN PATENT DOCUMENTS

| | | |
|---|---|---|
| EP | 1463365 A2 | 9/2004 |
| EP | 2317791 A2 | 5/2011 |
| EP | 2521389 A2 | 11/2012 |
| WO | 2012039574 A2 | 3/2012 |

OTHER PUBLICATIONS

International Search Report mailed May 19, 2014 in re International Application No. PCT/IB2013/055227 filed Jun. 25, 2013.

* cited by examiner

*Primary Examiner* — Keith Fang
(74) *Attorney, Agent, or Firm* — Coats & Bennett, PLLC

(57) ABSTRACT

A user device scans a list of one or more channels to detect a wireless access point (WAP) connected to a network. The scanned channels include those over which the WAP is permitted to transmit, as well as those over which the WAP is not permitted to transmit. The user device indicates to the user whenever it detects a WAP on a channel that the WAP is not allowed to transmit over.

12 Claims, 5 Drawing Sheets

| Channel No. | Frequency | North American Countries | Japan | Other Countries |
|---|---|---|---|---|
| 1 | 2412 | Yes | Yes | Yes |
| 2 | 2417 | Yes | Yes | Yes |
| 3 | 2422 | Yes | Yes | Yes |
| 4 | 2427 | Yes | Yes | Yes |
| 5 | 2432 | Yes | Yes | Yes |
| 6 | 2437 | Yes | Yes | Yes |
| 7 | 2442 | Yes | Yes | Yes |
| 8 | 2447 | Yes | Yes | Yes |
| 9 | 2452 | Yes | Yes | Yes |
| 10 | 2457 | Yes | Yes | Yes |
| 11 | 2462 | Yes | Yes | Yes |
| 12 | 2467 | No | Yes | Yes |
| 13 | 2472 | No | Yes | Yes |
| 14 | 2484 | No | 802.11b only | No |

*FIG. 1*

PRIOR ART

SYSTEM AND METHOD FOR DETECTING ACCESS POINTS TRANSMITTING OUTSIDE OF THE REGULATED FREQUENCY RANGE

FIELD OF THE INVENTION

The present invention relates generally to systems and methods for detecting wireless access points (WAPs), and more particularly to end user devices that detect WAPs transmitting on a frequency that is outside of a regulated range of frequencies.

BACKGROUND

Wireless Access Points (WAPs) are dedicated, specially-configured devices on data networks, such as a Wireless Local Area Network (WLAN). Generally, WAPs comprise a transceiver and function as a point of access into the WLAN for one or more end user devices, such as cellular telephones, computing devices, and other WiFi or BLUETOOTH enabled devices. In operation, the WAP establishes a communications link with a user device, and communicate signals and data between the WLAN and the user device.

Wireless Access Points are currently widely in use and may be found in homes, schools, and businesses. Further, WAPs may be open to allow anyone with a suitably-enabled device to access the network, or restricted to allow access only to those users having an appropriate password. However, since WAPs transmit radio signals, they are subject to regulations that stipulate the exact frequencies, or "channels," over which they may transmit and receive such signals. For example, FIG. 1 illustrates a table showing the WLAN channel-to-frequency mapping for the 2.4 GHz range. A WAP operating in this frequency band and connected to the WLAN would transmit and receive signals and data with user devices over the frequency assigned to the given channel. Thus, a WAP operating on channel 1, for example, would communicate signals and data with user devices over a frequency of 2412 MHz. A similar table exists for the 5 GHz frequency band and has different channel-to-frequency mappings.

Although the channel-frequency assignment is standard, different countries have different regulatory domains that govern channel usage. Because of the different regulatory domains, not all channels are allowed for use in all countries. For example, as seen in FIG. 1, most countries permit end user devices and WAPs connected to WLANs to communicate signals and data over channels 1-11 in the 2.4 GHz band. Japan and other countries also permit communications over channels 12 and 13. The North American countries do not normally permit communications over channels 12 and 13, and most countries, except for Japan, do not permit devices to communicate signals and data over channel 14.

Thus, there are differences in the channel assignments that each user device must consider when scanning for a WAP depending on their current location or region. These differences are even more pronounced for the 5 GHz band as there are many more channels and country-specific usage regulations.

Generally, WAP devices do have a method of dealing with these differences. Particularly, WAP devices are configured with information identifying their geographical region. This is usually accomplished, for example, via Global Positioning Satellite (GPS) functionality in the WAP, or by the user manually configuring this setting. However, this is not always the case. In many situations, users are not always savvy regarding these settings or how to properly configure the WAP. Consider, for example, a WAP set to transmit and receive on channel 13. If the WAP is in Japan or some European country, this may not pose a problem because in these countries, WAP devices are permitted to communicate over channel 13. For a WAP situated in the U.S., however, this could be problematic because WAPs are not normally permitted to transmit on this particular channel.

Typically, conventional user devices are equipped with, or have access to, information identifying their current geographical region (e.g., the country code). Based on this information, a user device will identify the channels that the WAP devices are permitted to communicate over and search only those channels. Thus, in the U.S., a user device would not waste the time and resources needed to scan for WAPs transmitting on channel 13 since it is not permitted to communicate with the WAP on that channel in the U.S. However, this also means that a user attempting to establish a connection with a WAP that is improperly configured to transmit on channel 13 would be unable to establish a communications link with the WAP. The user would interpret this lack of communications as a problem, but would be unable to determine the source of the problem, and therefore, be unable to correct the problem.

SUMMARY

The present invention provides a user device and method for identifying Wireless Access Points (WAPs) that are improperly configured and transmitting on a frequency that is prohibited for transmissions in the particular geographical region.

In one embodiment, a method for detecting a wireless access point (WAP) is performed at a user's device. With the method, the user device scans for WAPs over one or more non-allowed channels, each non-allowed channel having a corresponding frequency over which the WAPs are not permitted to transmit signals. The method indicates to a user of the device that the WAP is transmitting over a non-allowed channel responsive to detecting the WAP on the non-allowed channel.

In addition to scanning the non-allowed channels, the method calls for scanning for WAPs over one or more allowed channels, each allowed channel having a corresponding frequency over which the WAPs are permitted to transmit signals.

Advantageously, the method further comprises determining whether the WAP is transmitting on an allowed channel or a non-allowed channel based on the geographical location of the user device.

In one embodiment, determining whether the WAP is transmitting on a non-allowed channel comprises determining the identity of each non-allowed channel based on the current geographical location of the user device, comparing a channel identifier of the channel on which the WAP is detected to the non-allowed channel identities, and determining that the channel over which the WAP is detected is a non-allowed channel if the channel identifier matches one of the non-allowed channel identities.

In another embodiment, determining whether the WAP is transmitting on a non-allowed channel comprises determining the identity of each allowed channel based on the current geographical location of the user device, comparing a channel identifier of the channel on which the WAP is detected to the allowed channel identities, and determining that the channel over which the WAP is detected is a non-allowed channel if the channel identifier does not match any of the allowed channel identities.

In one embodiment, indicating to a user of the device that the WAP is transmitting over a non-allowed channel comprises generating a message for display to the user of the device.

In one embodiment, the method further comprises generating a reconfiguration message for the WAP and transmitting the reconfiguration message to the WAP over the non-allowed channel to control the WAP to cease transmitting on the non-allowed channel and begin transmitting on an allowed channel.

In addition to the method, embodiments of the present invention also provide a user device comprising a communications interface and a controller. The communications interface is configured to communicate signals and data with wireless access points (WAPs). The controller is configured to scan for the WAPs over one or more non-allowed channels, each non-allowed channel having a corresponding frequency over which the WAPs are not permitted to transmit signals, and indicate to a user of the device that a WAP is transmitting over a non-allowed channel responsive to detecting the WAP on a non-allowed channel.

In addition, the controller is further configured to scan for the WAPs over one or more allowed channels, each allowed channel having a corresponding frequency over which the WAPs are permitted to transmit signals.

In addition, the controller is further configured to determine whether the WAP is transmitting on an allowed channel or a non-allowed channel based on the geographical location of the user device.

In one embodiment, the controller is configured to determine the identity of each non-allowed channel for the current geographical location of the user device, compare a channel identifier of the channel over which the WAP is detected to the non-allowed channel identities, and determine that the channel over which the WAP is detected is a non-allowed channel if the channel identifier matches one of the non-allowed channel identities.

In another embodiment, the controller is configured to determine the identity of each allowed channel for the current geographical location of the user device, compare a channel identifier of the channel over which the WAP is detected to the allowed channel identities, and determine that the channel over which the WAP is detected is a non-allowed channel if the channel identifier does not match any of the allowed channel identities.

In one embodiment, the user device also comprises a display. Additionally, the controller may be configured to generate a message for the user of the device indicating that the WAP is transmitting on a non-allowed channel and send the message to the display for display to the user.

In one embodiment, the controller is configured to generate a reconfiguration message for the WAP and transmit the reconfiguration message to the WAP over the non-allowed channel to control the WAP to cease transmitting on the non-allowed channel and begin transmitting on an allowed channel.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

FIG. 1 is a table illustrating the WLAN channel-to-frequency mapping for a 2.4 GHz band.

DETAILED DESCRIPTION

The present invention provides a user communication device, such as a cellular telephone, for example, configured to scan both "allowed" channels and "non-allowed" channels for wireless access points (WAPs). As defined herein, "allowed" channels are channels that are allowed for use in transmitting signals and/or data over a given frequency. "Non-allowed" channels are channels that are not allowed for use in transmitting signals and/or data over a given frequency. Whether a channel is an "allowed" channel or a "non-allowed" channel depends on the particular country or region in which the device communicating on the channel is located. By configuring user devices to scan the "non-allowed" channels for a given geographical region, the present invention can inform a user whether a given WAP is improperly configured to use a "non-allowed" channel. So informed, the user can take corrective action to properly configure the WAP.

Figure 2:
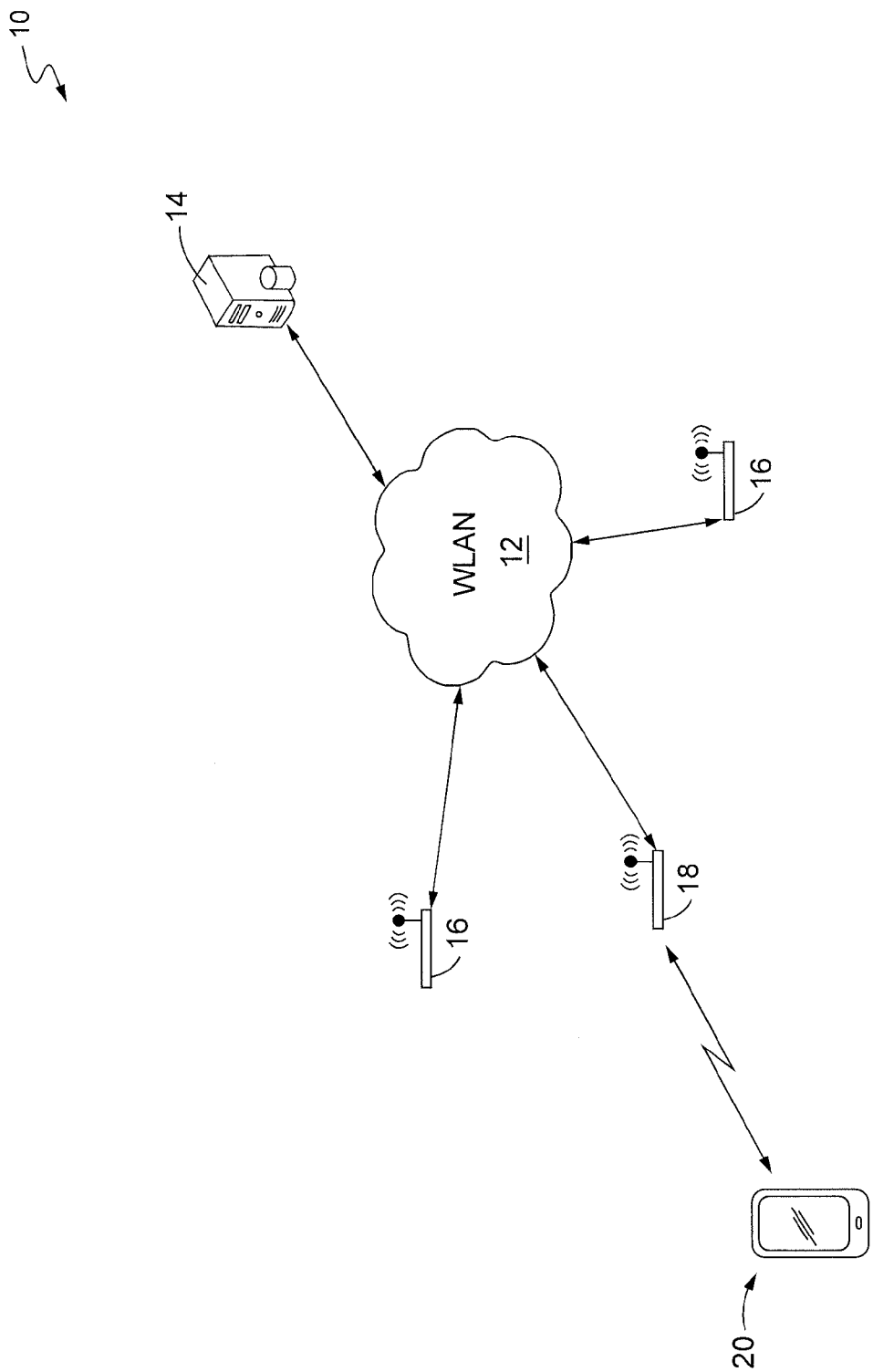
FIG. 2 is a functional block diagram illustrating a communications network configured according to one embodiment of the present invention.

Turning now to the drawings, FIG. 2 is a block diagram illustrating a communications system 10 configured to operate according to one embodiment of the present invention. System 10 comprises an Wireless Local Area Network (WLAN) 12, for example, interconnecting a plurality of network servers 14 to one or more WAPs 16, 18, The WAPs 16, 18, in turn, enable a user device 20 to communicate signals and data with the plurality of network servers 14.

The operations and functions of the WLAN 12, the servers 14, and the WAPs 16, 18 are well-known in the art and not germane to the present invention. As such, they are not described in detail here. It is sufficient to understand that each WAP 16, 18 should be configured to operate only on channels that are "allowed" in the geographical area in which it is located. In this embodiment, all WAPs 16, 18 are located in the same country, and thus, all WAPs 16, 18 are subject to the same regulatory constraints with respect to channel-frequency mapping. However, for purposes of illustration, WAPs 16 are properly configured to transmit and receive on an allowed channel, while WAP 18 is not. As described in more detail later, the user device 20 is configured to detect both the properly configured WAPs 16 and the improperly configured WAP 18, and generate a message or other alarm to notify the user about the improperly configured WAP 18. Once notified, the user may take corrective action, such as re-configuring the WAP 18 to use an allowed channel.

Figure 3:
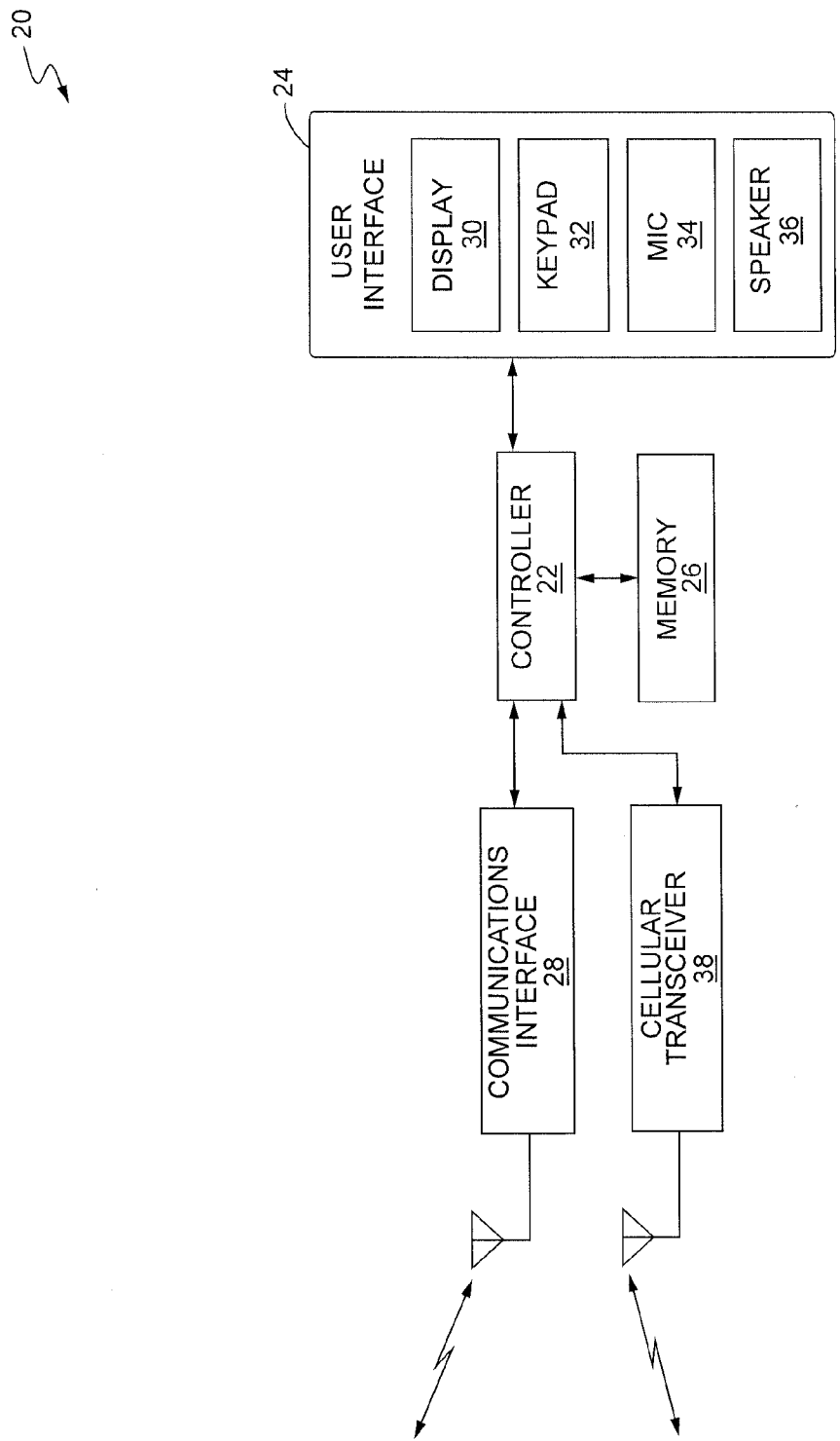
FIG. 3 is a functional block diagram of some components of an end user device configured according to one embodiment of the present invention.

FIG. 3 is a block diagram illustrating some components of a user device 20 configured to detect improperly configured WAPs 18 according to one or more embodiments of the present invention. Although the embodiments herein describe device 20 as being a cellular telephone, those of ordinary skill in the art will readily appreciate that the present invention is not so limited. Device 20 may comprise any communications device that is able to communicate signals and data with WLAN 12. Such devices also include, but are not limited to, computing devices such as laptop computers, desktop computers, and tablet computing devices.

As seen in FIG. 3, user device 20 comprises a programmable controller 22 that communicatively connects a user I/O interface 24, a memory 26, and a communications interface 28. The user I/O interface 24, in turn, comprises one or more components that allow the user to interact with and control device 20. Such components include, but are not limited to, a display 30, a keypad 32, a microphone 34, and a speaker 36. As is known in the art, device 20 may include other components and/or software modules (e.g., Global Positioning Satellite (GPS) circuitry and related software); however, while it is understood that these other components and/or software modules may exist on device 20, they are not explicitly shown here for brevity.

Controller 22 generally controls the operation of the user device 20 according to programs and data stored in memory 26. Exemplary programs and instructions include, but are not limited to, operating system software, communications software, and supporting data that allows the device 20 to determine its geographical position. Such location determination may be based, for example, on signals and data received from GPS circuitry, or from a communications network with which device 20 communicates. The control functions performed by controller 12 may be implemented, for example, in a single microprocessor, or in multiple microprocessors. Suitable microprocessors may include general purpose and special purpose microprocessors, as well as digital signal processors.

As is conventional, controller 22 is configured to scan for WAPs 16 that are properly configured to transmit signals and data on an "allowed" channel. As stated above, "allowed" channels are predetermined and country-specific, and thus, a device 20 located in the U.S. may scan a different set of allowed channels than a device 20 located in Japan, for example, or in some other country. Most WAPs, such as WAPs 16, are properly configured for their geographical location or region, and thus, transmit and receive only on allowed channels (i.e., allowed frequencies). However, for one reason or another, many WAPs, such as WAP 18, are not properly configured for their location. These WAPs therefore transmit and receive signals and data on a "non-allowed" channel. Such signals include the signals that a user device, such as device 20, would scan for when attempting to locate a WAP. As described in more detail below, the controller 22 of device 20 is configured to scan both the allowed channels and the non-allowed channels for WAPs. If controller 22 detects a WAP that is transmitting on a non-allowed channel for its geographical region, controller 22 generates an alert to inform the user. The alert may be, for example, an informational dialog message output to display 30, an audible alarm indicator, or both.

Memory 26 is a computer readable medium representing the entire hierarchy of memory in, or accessible to, device 20. Memory 26 may comprise both random access memory (RAM) and read-only memory (ROM), and may be implemented, for example, as one or more discrete devices, stacked devices, or removable devices, such as a flash drive or memory stick. As is known in the art, memory 26 may or may not be integrated with controller 22.

In one or more embodiments of the present invention, memory 26 is configured to store the channel-frequency mapping tables previously described for one or more frequency bands. Controller 22 may be configured to refer to these tables to determine which frequency it needs to scan for a given channel, as well as to determine which channels are allowed channels, and which are non-allowed channels.

The communications interface 28 may comprise any transceiver for transmitting and receiving data, such as downloaded video and/or audio content, to and from a network server 14 connected to a WLAN 12. Thus, in one embodiment, interface 28 comprises a short-range transceiver operating according to Wi-Fi standards, BLUETOOTH standards, or any standard associated with the IEEE 802.xx family of standards. As known in the art, such interfaces allow device 20 to periodically scan for WAPs 16, 18, and to establish a communications link with a detected WAP. Once established, device 20 can exchange signals and data with server 14 via network 12.

Additionally, in embodiments where device 20 is a cellular communications device (e.g., a cellular telephone), device 20 may also comprise a fully functional cellular radio transceiver 38 that operates according to any known standard. Such standards include, but are not limited to, the Global System for Mobile Communications (GSM), TIA/EIA-136, cdmaOne, cdma2000, UMTS, and Wideband CDMA. As is known in the art, the cellular radio transceiver 38 permits the user of the device 20 to communicate with one or more remote parties or devices via a Base Station Subsystem (BSS).

Figure 4:
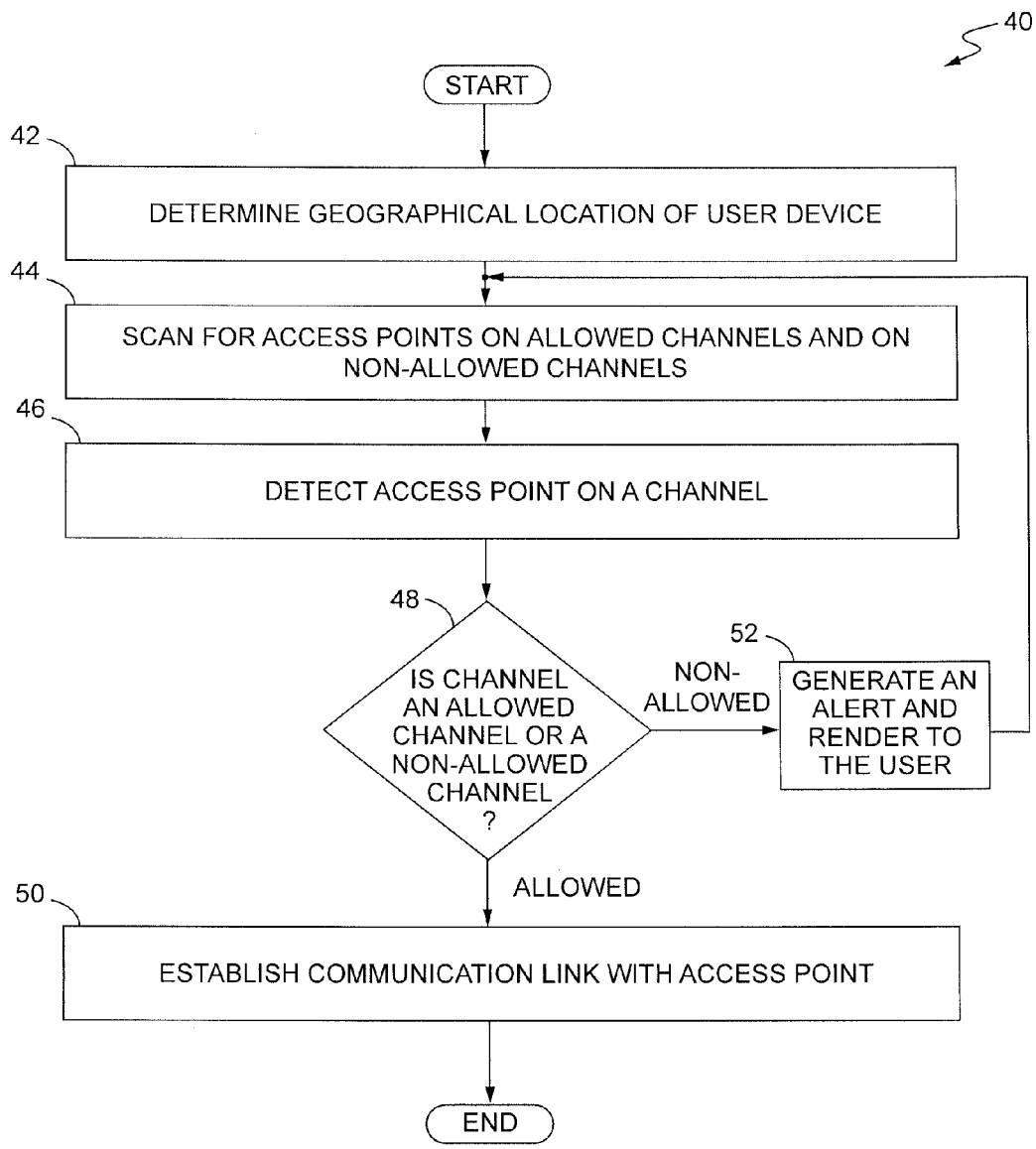
FIG. 4 is a flow diagram illustrating a method of performing the present invention at an end user device according to one embodiment.

FIG. 4 is a flow chart that illustrates a method 40 of scanning for improperly configured WAPs, such as WAP 18. The method is performed by controller 22 at the user device 20.

Method 40 begins with the device 20 determining its geographical location (box 42). This may be done using any means known in the art. In one embodiment, for example, the controller 22 accesses a data table of country codes or configuration settings stored in memory 26. In another embodiment, device 20 receives this information from a communications network via interface 28 or transceiver 38, for example. However this information is obtained, controller 22 uses information associated with the device 20 to determine the country or region in which it is currently situated.

Once controller 22 determines its current geographical location, controller 22 will, from time-to-time, scan for WAPs 16, 18 (box 44). As is conventional, the controller 22 may scan a preferred list of WAPs first. If no preferred WAPs are found, the controller 22 may then scan for other non-preferred WAPs transmitting on allowed channels. However, in accordance with one or more embodiments of the present invention, the controller 22 is also configured to scan for WAPs that may be transmitting on a non-allowed channel.

By way of example, WAP 18 may be located in the United States along with the WAPs 16. However, because it was improperly configured, WAP 18 may be transmitting on non-allowed channel 13. A device 20 configured according to this embodiment will listen on both the allowed and the non-allowed channels for the United States, and detect WAPs 16 that are transmitting on allowed channels, as well as WAP 18 that is transmitting on a non-allowed channel.

Once a WAP is detected, the controller 22 determines whether the channel on which it detected the WAP transmissions is an allowed channel or a non-allowed channel (box 48). This may be accomplished, for example, by comparing a channel identifier (e.g., the channel number) on which the transmission was received to a list of allowed channel identities for the country code currently associated with the device. If the channel identifier matches one of the identities on the list of allowed channels, the controller 22 determines that the WAP is transmitting on an allowed channel. The controller 22 may then utilize well-known methods and protocols to establish a communications link with the WAP (box 50). However, if the channel identifier does not match any of the identities on the list of allowed channels, the controller 22 determines that the WAP is transmitting on a non-allowed channel. The controller 22 then generates an alert to indicate the improper WAP configuration and renders the alert to the user (box 52). Once rendered, the controller 22 may return to its scanning operations to find a WAP using an allowed channel.

Those of ordinary skill in the art should understand that there are other means by which to determine whether a given detected WAP is or is not transmitting on a non-allowed channel. In another embodiment, for example, the controller 22 compares the channel identifier to a list of non-allowed channel identities. In such cases, the controller 22 determines that the detected WAP is transmitting on a non-allowed channel if the channel identifier matches an identity on that list. If the channel identifier does not match any of the identities on the non-allowed channel list, the controller 22 determines that the WAP is transmitting on an allowed channel.

Additionally, the alert indications may comprise any type of indication known in the art. In one embodiment, however, the generated alert indication comprises a dialog message that is displayed to the user. The message may include any information needed or desired, but in one embodiment, the controller 22 extracts the identity of the detected WAP from the signals it received on the non-allowed channel, and identifies the non-allowed channel. The controller 22 then formats a message to display that information to the user on display 30. Upon viewing the information, the user may take corrective action, for example, to configure the WAP to transmit on an allowed channel.

As those skilled in the art will readily appreciate, the user device 20 would be prohibited from transmitting signals and data on the non-allowed channel. Hence, in one embodiment, the user is simply informed of the improperly configured WAP. However, there may be cases in which certain types of transmissions might be allowed even though such transmissions would be on a non-allowed channel.

By way of example, the regulatory body for North American countries currently allows low-power transmissions on channels 12 and 13 even though those particular channels are "non-allowed" channels. Some embodiments of the present invention could therefore advantageously generate corrective signals or messages for an improperly configured WAP, and transmit those corrective signals or messages at low power to remotely reconfigure the WAP. The messages may be automatically generated and sent to the improperly configured WAP, or the device 20 may present the user with an option to generate and send the corrective messages.

Figure 5:
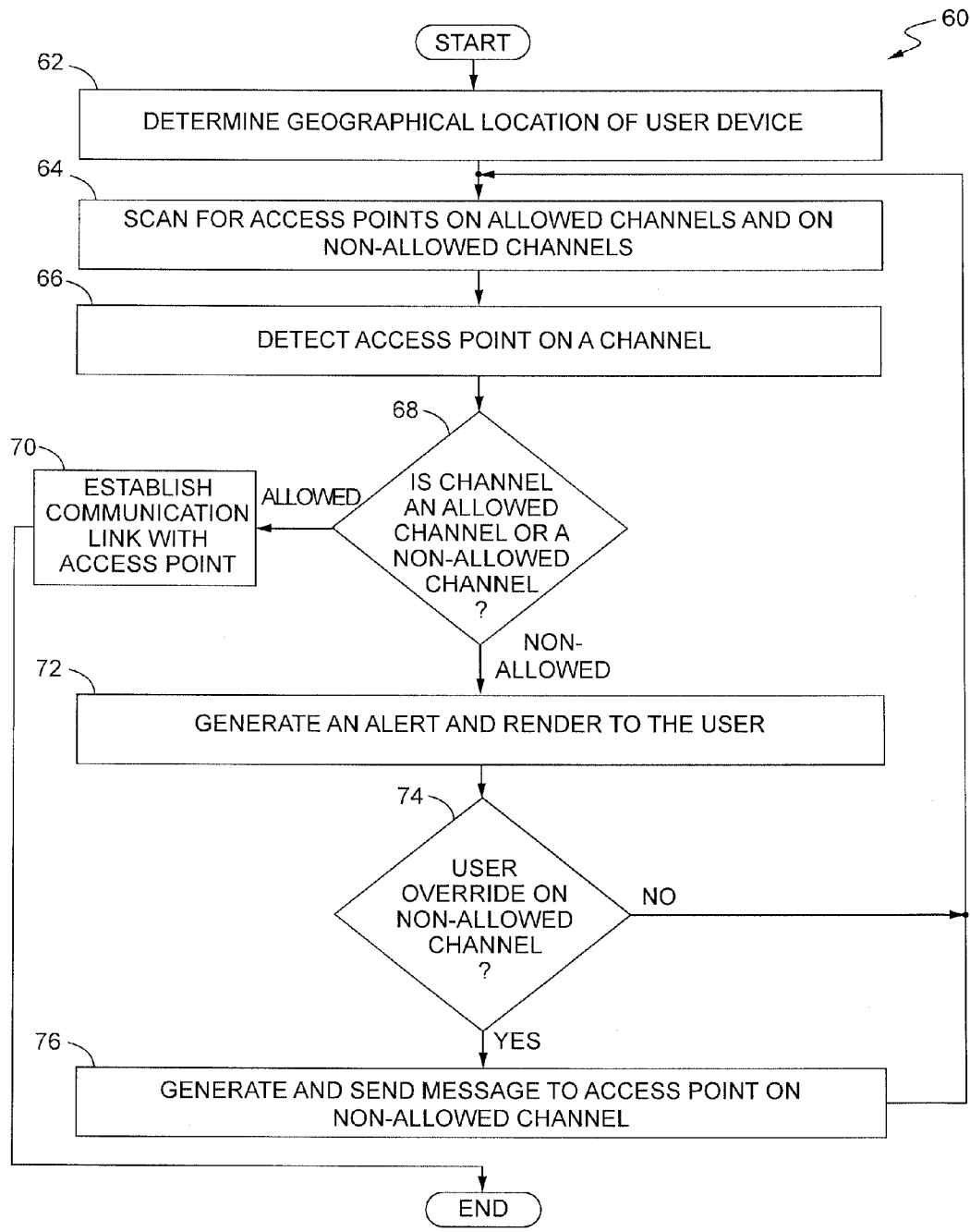
FIG. 5 is a flow diagram illustrating a method or performing the present invention at an end user device according to one embodiment.

FIG. 5 is a flow chart of a method 60 performed at the user's device 20 for generating and sending corrective messages to an improperly configured WAP, such as WAP 18, according to one embodiment of the present invention. Method 60 begins with the controller 22 determining the current geographical location for device 20, as previously described (box 62). Controller 22 then periodically scans for WAPs 16, 18 on allowed and non-allowed channels (box 64). Upon detecting a WAP (box 66), the controller 22 determines whether the WAP is transmitting on an allowed channel or a non-allowed channel, as previously described (box 68). If the detected WAP is transmitting on an allowed channel, controller 22 simply establishes a communications link with the WAP using known methods and procedures (box 70). However, if the WAP is transmitting on a non-allowed channel, the controller 22 generates an alert message and renders the alert message to the user (box 72).

The alert message, in addition to identifying the particular WAP to the user, may present the option of overriding the regulatory prohibition on transmitting from device 20 on the non-allowed channel (box 74). If the user chooses not to override the prohibition, the controller 22 may return to scan for another WAP transmitting on an allowed or non-allowed channel. If the user does wish to override the prohibition, however, the controller 22 may generate a message and send it to the detected WAP at low-power via the communications interface 28 (box 76). The power level at which the message is sent may be predetermined and non-adjustable, and may be mandated to stay under a certain threshold. Such constraints could help to ensure that the transmissions from the user's device 20 over the non-allowed channel are only for very short-range distances (e.g., a few feet or meters), thereby ensuring that the transmissions do not interfere with other devices that are permitted to transmit over that particular frequency.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein

What is claimed is:

1. A method for detecting a wireless access point (WAP), the method performed at a user device and comprising:
    scanning for WAPs over one or more non-allowed channels, each non-allowed channel having a corresponding frequency over which the WAPs are not permitted to transmit signals; and
    indicating to a user of the device that a WAP is transmitting over a non-allowed channel responsive to detecting the WAP on the non-allowed channel;
    generating a reconfiguration message for the WAP; and
    transmitting the reconfiguration message to the WAP over the non-allowed channel to control the WAP to cease transmitting on the non-allowed channel and begin transmitting on an allowed channel.

2. The method of claim 1 further comprising scanning for the WAPs over one or more allowed channels, each allowed channel having a corresponding frequency over which the WAPs are permitted to transmit signals.

3. The method of claim 2 further comprising determining whether the WAP is transmitting on an allowed channel or a non-allowed channel based on the geographical location of the user device.

4. The method of claim 3 wherein determining whether the WAP is transmitting on a non-allowed channel comprises:
    determining the identity of each non-allowed channel based on the current geographical location of the user device;
    comparing a channel identifier of the channel on which the WAP is detected to the non-allowed channel identities; and
    determining that the channel over which the WAP is detected is a non-allowed channel if the channel identifier matches one of the non-allowed channel identities.

5. The method of claim 3 wherein determining whether the WAP is transmitting on a non-allowed channel comprises:
    determining the identity of each allowed channel based on the current geographical location of the user device;
    comparing a channel identifier of the channel on which the WAP is detected to the allowed channel identities; and
    determining that the channel over which the WAP is detected is a non-allowed channel if the channel identifier does not match any of the allowed channel identities.

6. The method of claim 1 wherein indicating to a user of the device that the WAP is transmitting over a non-allowed channel comprises generating a message for display to the user of the device.

7. A user device comprising:
- a communications interface configured to communicate signals and data with wireless access points (WAPs); and
- a controller configured to:
    - scan for the WAPs over one or more non-allowed channels, each non-allowed channel having a corresponding frequency over which the WAPs are not permitted to transmit signals;
    - indicate to a user of the device that a WAP is transmitting over a non-allowed channel responsive to detecting the WAP on a non-allowed channel;
    - generate a reconfiguration message for the WAP; and
    - transmit the reconfiguration message to the WAP over the non-allowed channel to control the WAP to cease transmitting on the non-allowed channel and begin transmitting on an allowed channel.

8. The user device of claim 7 wherein the controller is further configured to scan for the WAPs over one or more allowed channels, each allowed channel having a corresponding frequency over which the WAPs are permitted to transmit signals.

9. The user device of claim 8 wherein the controller is further configured to determine whether the WAP is transmitting on an allowed channel or a non-allowed channel based on the geographical location of the user device.

10. The user device of claim 9 wherein the controller is further configured to:
- determine the identity of each non-allowed channel for the current geographical location of the user device;
- compare a channel identifier of the channel over which the WAP is detected to the non-allowed channel identities; and
- determine that the channel over which the WAP is detected is a non-allowed channel if the channel identifier matches one of the non-allowed channel identities.

11. The user device of claim 9 wherein the controller is further configured to:
- determine the identity of each allowed channel for the current geographical location of the user device;
- compare a channel identifier of the channel over which the WAP is detected to the allowed channel identities; and
- determine that the channel over which the WAP is detected is a non-allowed channel if the channel identifier does not match any of the allowed channel identities.

12. The user device of claim 7 further comprising a display, and wherein the controller is further configured to:
- generate a message for the user of the device indicating that the WAP is transmitting on a non-allowed channel; and
- sending the message to the display for display to the user.

* * * * *